US008712902B2

(12) United States Patent
Jobs et al.

(10) Patent No.: US 8,712,902 B2
(45) Date of Patent: Apr. 29, 2014

(54) ADVERTISEMENT IN OPERATING SYSTEM

(75) Inventors: Steven Jobs, Palo Alto, CA (US); Freddy A. Anzures, San Francisco, CA (US); Mike Matas, San Francisco, CA (US); Gregory N. Christie, San Jose, CA (US); Patrick Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 731 days.

(21) Appl. No.: 12/105,863

(22) Filed: Apr. 18, 2008

(65) Prior Publication Data

US 2010/0185674 A1   Jul. 22, 2010

(51) Int. Cl.
*G06Q 40/00* (2012.01)

(52) U.S. Cl.
USPC .......................................................... 705/37

(58) Field of Classification Search
None
See application file for complete search history.

(56) References Cited

U.S. PATENT DOCUMENTS

| 6,317,593 | B1 | 11/2001 | Vossler | |
|---|---|---|---|---|
| 2002/0007313 | A1* | 1/2002 | Mai et al. | 705/14 |
| 2002/0077900 | A1* | 6/2002 | Thompson et al. | 705/14 |
| 2002/0133397 | A1* | 9/2002 | Wilkins | 705/14 |
| 2003/0163371 | A1* | 8/2003 | Beard | 705/14 |
| 2004/0249708 | A1* | 12/2004 | Jacobs et al. | 705/14 |
| 2005/0033638 | A1* | 2/2005 | Donnet et al. | 705/14 |
| 2006/0074550 | A1* | 4/2006 | Freer et al. | 701/209 |
| 2006/0167820 | A1* | 7/2006 | Jeong et al. | 705/67 |
| 2007/0038516 | A1* | 2/2007 | Apple et al. | 705/14 |
| 2007/0162951 | A1 | 7/2007 | Rashkovskiy et al. | |
| 2008/0215436 | A1* | 9/2008 | Roberts | 705/14 |
| 2008/0294503 | A1* | 11/2008 | Borislow et al. | 705/10 |

OTHER PUBLICATIONS

'General Info' [Online]. Mac University of Utah, Jun. 13, 2006, [retrieved on Jul. 6, 2009]. Retrieved from the Internet: http://www.macos.utah.edu/documentation/operating_systems/mac_os_8-6/general_info.html.
'Guidebook' [Online], Mac OS 8.5, [retrieved on Jul. 6, 2009] [Published on Apr. 16, 2007] Retrieved from the Internet: http://web.archive.org/web/20070416113334/http://guidebookgallery.org/ads/magazines/macos/macos85-1.
'PointCast 2.0 beta out' [Online], CNET News by Nick Wingfield, Jun. 2, 1997 [retrieved on Jul. 6, 2009]. Retrieved from the Internet: http://news.cnet.com/PointCast-2.0-beta-out/2100-1001_3-200125.html.
'General Info' [Online]. Mac University of Utah, Jun. 13, 2006, [retrieved on Jul. 6, 2009]. Retrieved from the Internet: http://www.macos.utah.edu/documentation/operating_systems/mac_os_8-6/general_info.html. Pursuant to 37 C.F.R. §1.98(d), the references are not being provided herewith since they were previously sent to the Patent and Trademark Office during the prosecution of prior U.S. Appl. No. 12/105,916, filed Apr. 18, 2008.

(Continued)

*Primary Examiner* — Sarah Monfeldt
*Assistant Examiner* — Jennifer Liu
(74) *Attorney, Agent, or Firm* — Novak Druce Connolly Bove + Quigg LLP (57) ABSTRACT

Among other disclosure, an operating system that presents one or more advertisements to a user. The operating system can disable one or more functions while the advertisement is being presented. At the end of the advertisement, the operating system can again enable the function(s). The advertisement can be visual or audible. The presentation of the advertisement(s) can be made as part of an approach where the user obtains a good or service, such as the operating system, for free or at reduced cost.

19 Claims, 7 Drawing Sheets

(56) References Cited

OTHER PUBLICATIONS

'Guidebook' [Online], Mac OS 8.5, [retrieved on Jul. 6, 2009] [Published on Apr. 16, 2007] Retrieved from the Internet: http://web.archive.org/web/20070416113334/http://guidebookgallery.org/ads/magazines/macos/macos85-1. Pursuant to 37 C.F.R. §1.98(d), the references are not being provided herewith since they were previously sent to the Patent and Trademark Office during the prosecution of prior U.S. Appl. No. 12/105,916, filed Apr. 18, 2008.

'PointCast 2.0 beta out' [Online], CNET News by Nick Wingfield, Jun. 2, 1997 [retrieved on Jul. 6, 2009]. Retrieved from the Internet: http://news.cnet.com/PointCast-2.0-beta-out/2100-1001_3-200125.html. Pursuant to 37 C.F.R. §1.98(d), the references are not being provided herewith since they were previously sent to the Patent and Trademark Office during the prosecution of prior U.S. Appl. No. 12/105,916, filed Apr. 18, 2008.

\* cited by examiner

ADVERTISEMENT IN OPERATING SYSTEM

TECHNICAL FIELD

This invention relates to computer devices.

BACKGROUND

Many devices have operating systems that control their function. For example, computers, cell phones and handheld devices can have different kinds of operating systems. With some categories of devices, such as a personal computer, the user can have the ability to choose between operating systems available from different manufacturers. As another example, a user currently using an operating system may want to upgrade to a more recent version of that operating system.

Thus, there are several reasons why a user might consider obtaining an operating system for the device, whether it be the first operating system ever installed on the device or a replacement for an existing operating system. The choice among several operating systems necessarily takes into account device compatibility, but can also be based on other factors, such as the functions they offer, their usability and reliability, and also the cost of obtaining and maintaining the operating system.

SUMMARY

The invention relates to computer devices.

In a first aspect, a computer-implemented method for operating a device includes presenting in a device an advertisement provided from an operating system of the device.

Implementations can include any, all or none of the following features. The method can further include receiving user input prompting the presentation of the advertisement to be postponed for a predefined amount of time; postponing, in response to user input, the presentation of the advertisement by the predefined amount of time; and reducing a time until a subsequent advertisement is presented by the predefined amount of time. The method can further include receiving user input prompting the advertisement to be presented a predefined amount of time earlier than scheduled, wherein the advertisement is presented according to the user input; and extending, in response to the user input and by the predefined amount of time, a time until a subsequent advertisement is presented. The advertisement can be presented using a presentation technique selected from the group consisting of: presenting the advertisement as a pane on top of any other pane in a user interface of the device; presenting the advertisement in a designated area of a background of the user interface; presenting the advertisement in a window for an application program; presenting the advertisement inserted in content from an application program; presenting the advertisement through an audio output of the device; and combinations thereof. The method can further include determining whether a user pays attention to the advertisement. The determination can include performing, while the advertisement is presented, an operation that urges the user to respond; and detecting whether the user responds to the performed operation. The method can further include presenting in the device a user-selectable control that when activated triggers at least one selected from the group consisting of: causing presentation of a page from an advertiser associated with the advertisement; recording a user rating of the advertisement; again presenting the advertisement; sharing the advertisement with another user; initiating a transaction for user purchase of a product that eliminates the presentation of advertisements in the device; postponing presentation of the advertisement; causing the advertisement to be presented ahead of schedule; causing a previous advertisement to be presented; causing a preview of a subsequent advertisement to be presented; causing an overview of all available advertisements to be presented; and initiating a transaction for user purchase of a product or service to which the advertisement relates. The method can further include disabling a function in the device, wherein the advertisement can be presented while the function is disabled; and enabling the function in response to the advertisement ending.

In a second aspect, a computer program product is tangibly embodied in a computer-readable medium and includes instructions that when executed by a processor perform a method for operating a device. The method includes presenting in a device an advertisement provided from an operating system of the device.

In a third aspect, a computer-implemented method for providing an advertisement on a device includes providing an operating system for a device, the operating system configured to present at least one advertisement in the device. The method includes receiving a report from the device where the operating system is installed, the report confirming that the advertisement has been presented.

Implementations can include any, all or none of the following features. The method can further include identifying, using the report, usage of the device relating to the presentation of the advertisement. Identifying the usage can include determining whether a user pays attention to the advertisement. The method can further include selecting the advertisement for the operating system based on information about a user of the device.

In a fourth aspect, a computer program product is tangibly embodied in a computer-readable medium and comprising instructions that when executed by a processor perform a method for providing an advertisement on a device. The method includes providing an operating system for a device, the operating system configured to present at least one advertisement in the device. The method includes receiving a report from the device where the operating system is installed, the report confirming that the advertisement has been presented.

In a fifth aspect, an operating system is tangibly embodied in a computer-readable medium and includes an advertisement that the operating system is configured to present in a device.

Implementations can include any, all or none of the following features. The operating system can be configured to present the advertisement using a presentation technique selected from the group consisting of: presenting the advertisement as a pane on top of any other pane in a user interface of the device; presenting the advertisement in a designated area of a background of the user interface; presenting the advertisement in a window for an application program; presenting the advertisement inserted in content from an application program; presenting the advertisement through an audio output of the device; and combinations thereof.

In a sixth aspect, a computer program product is tangibly embodied in a computer-readable medium, the computer program product including instructions that, when executed, generate on a display of a computing device a graphical user interface for managing a presentation of one or more advertisements. The graphical user interface includes an advertisement presentation area for presenting at least one advertisement provided from an operating system that generates the graphical user interface.

Implementations can include any, all or none of the following features. The graphical user interface can further include a user-selectable control that when activated triggers at least one selected from the group consisting of: causing presentation of a page from an advertiser associated with the advertisement; recording a user rating of the advertisement; again presenting the advertisement; sharing the advertisement with another user; initiating a transaction for user purchase of a product that eliminates the presentation of advertisements in the device; postponing presentation of the advertisement; causing the advertisement to be presented ahead of schedule; causing a previous advertisement to be presented; causing a preview of a subsequent advertisement to be presented; causing an overview of all available advertisements to be presented; and initiating a transaction for user purchase of a product or service to which the advertisement relates. The graphical user interface can further include a timing indicator that indicates a preset time at which the presentation of the advertisement is to be executed. The graphical user interface can present an animation upon reaching the preset time.

Implementations can include any, none or all of the following advantages: An improved operating system can be provided. An improved distribution of an operating system can be provided. Improved distribution and/or presentation of an advertisement can be provided. Improved control of a device during advertisement presentation can be provided.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
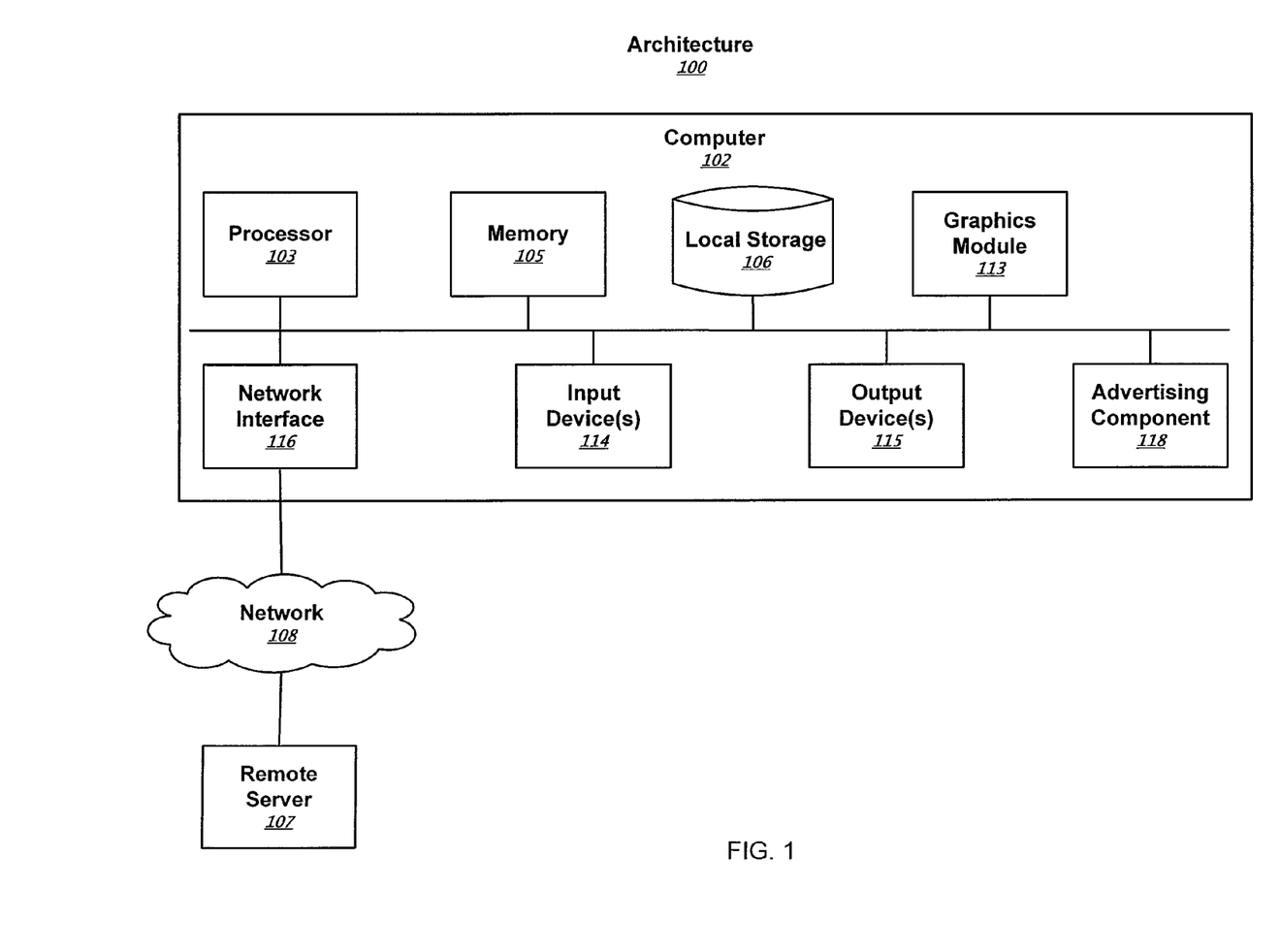
FIG. 1 is a block diagram of an architecture for presenting advertisements.

FIG. 1 is a block diagram of an exemplary architecture 100 (e.g., a hardware architecture) for presenting advertisements. In some implementations, at least one function of an operating system can be temporarily disabled while presenting the advertisement(s). As used herein, an advertisement is a presentation of information (e.g. commercials, marketing information, announcements, etc.). For example, a person may be allowed to obtain and use the operating system, or a computer program or hardware, for free or at reduced cost so long as the person agrees to view or listen to advertisements (e.g., commercials) that are presented.

The architecture 100 here includes a personal computer 102 coupled to a remote server 107 via a network interface 116 and a network 108 (e.g., local area network, wireless network, Internet, intranet, etc.). The computer 102 generally includes a processor 103, memory 105, one or more input devices 114 (e.g. keyboard, mouse, game controller, microphone, camera, touch screen) and one or more output devices 115 (e.g. display device, video output, audio output, tactile feedback). A user interacts with the architecture 100 via the input and output devices 114, 115. Architecture 100 as disclosed includes various hardware elements. Architecture 100 can include hardware, software, or combinations of the two. Other architectures can be used, including some that do not have a client-server configuration.

The computer 102 here also includes a local storage device 106 and a graphics module 113 (e.g., graphics card) for storing information and generating graphical objects, respectively. The local storage device 106 can be a computer-readable medium. The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

Systems and methods are provided for the presentation of advertisements. The systems and methods can be stand alone or otherwise integrated into a more comprehensive application. In the materials presented below, an integrated system for presenting advertisements is disclosed. While the presentation of advertisements is discussed by way of example below, other forms of content can be presented to the user.

The following notes apply to one or more implementations described herein: The implementation of advertisement presentation in an operating system (OPS) can require an analysis of the level of security required from the perspective of the manufacturer or provider of the computer system. For example, a system architecture can be designed (or modified) to supply advertisement presentation, in a way that ensures or seeks to ensure that a user does not bypass the presentation and thereby renders it fully or partially ineffective. A person implementing OPS-based advertising can analyze a hardware structure and identify one or more points (e.g., parts and subparts) therein to which the advertisement presentation should be tied, both for purposes of facilitating the presentation and to provide the above-mentioned resistance against user actions. For example, hardware points can be identified and controlled accordingly, so that the advertisement presentation can in effect "take over the system" in relevant aspects for a limited time.

In implementations where the OPS-based advertising is provided using executable code in the system, it can be necessary or desirable to protect that code from being removed, rendered inoperative, bypassed or manipulated. As another example, the system can provide constant or repeated monitoring of whether the system presents the advertisement(s) as scheduled. If non-presentation is detected, the system can invoke one or more enforcement routines to seek compliance with the advertisement presentation schedule. Such enforcement routines can include, but are not limited to, disabling the system in whole or in part, reporting the issue to a responsible party, invoking an alternative way of presenting the advertisement (such as by audio when visual presentation is impeded), or by registering the non-compliance in a log that can later be used in a follow-up process. In some implementations, an enforcement routine is implemented in a different part of the system (e.g., in a different software and/or other system component) than the OPS-based advertising feature it is designed to monitor. For example, an operating system can have a windows server that maintains windows and controls their presentation on a display screen, and the windows server in such an implementation can be configured or modified to provide for OPS-based advertising. As another example, when the advertising is visually presented in a user interface the system can be designed to not allow anything to be presented over that interface, or to prevent anything from being drawn on top of it.

While the presentation of advertisements is described in examples herein with respect to a personal computer 102, it should be apparent that the disclosed implementations can be incorporated in, or integrated with, any electronic device, e.g., a device that has a visual user interface, including without limitation, portable and desktop computers, servers, electronics, media players, game devices, mobile phones, wireless devices, email devices, personal digital assistants (PDAs), embedded devices, televisions, set top boxes, etc.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for presentation and use of advertisements can also be implemented as one or more software applications running on the computer 102. Such a system and method can be characterized as a framework or model that can be implemented on various platforms and/or networks (e.g., client/server networks, stand-alone computers, portable electronic devices, mobile phones, etc.), and/or embedded or bundled with one or more software applications (e.g., email, media player, browser, etc.). The architecture 100 includes an advertising component 118 that is configured to disable at least one function of the operating system and to present advertisements, for example by presenting them on the display device 113, and then enabling the disabled function or functions in response to the advertisement ending.

Figure 2:
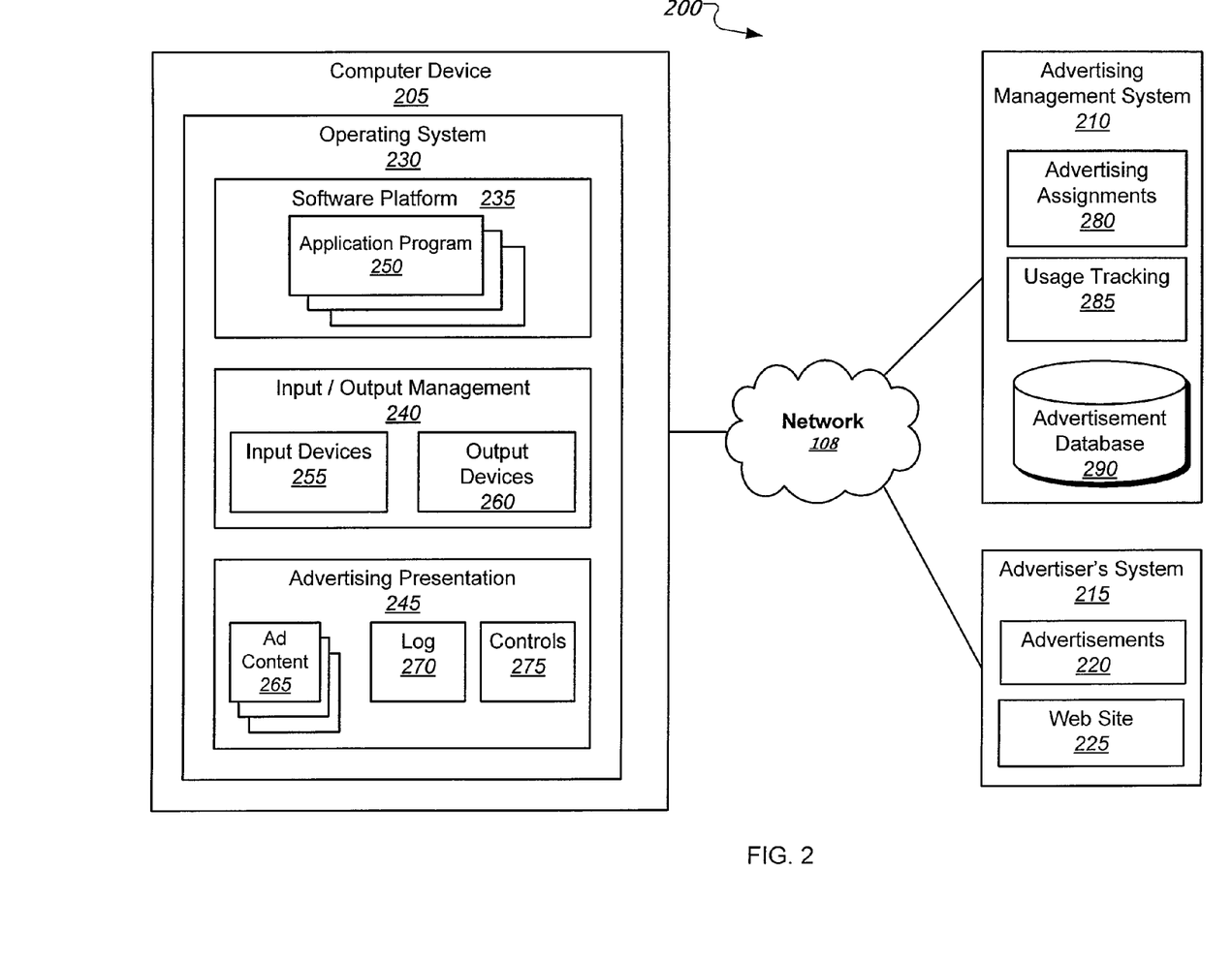
FIG. 2 is a block diagram of an example of an architecture for managing and presenting advertisements.

FIG. 2 is a block diagram of an example of a system 200 for the management and presentation of advertisements. The system 200 includes a computer device 205 that is connected to an advertising management system 210 and an advertiser's system 215 through the network 108. Generally, the advertising management system 210 distributes advertisements relating to goods or services for one or more vendors that operate the advertisement system 215, and the computer device 205 presents advertisements 220 for the products, goods, and/or services being promoted by the advertiser's system 215.

Each advertisement 220 may have various intrinsic features. Such features may be specified by an application and/or an advertiser, often depending on the type of online ad. The advertisement 220 may include, for example, a rectangular banner ad, an audio ad, a video clip, an image file, executable code, embedded information, or any other media, content, or interactive advertisement. For example, in the case of a text advertisement, advertisement features may include a title line (e.g., the name of a product), advertisement text (e.g., text describing the general nature of the product), and an embedded link (e.g., a URL) that links to a landing page (e.g., web site 225) provided by an associated advertiser. In the case of an image ad, advertisement features may include one or more images (e.g., images of a product), executable code (e.g., embedded HTML code), and an embedded link. While the advertisements 220 are shown to reside with the advertiser's system 215, the advertisements 220 also can be stored in the advertising management system 210, or stored with the ad content 265 in the computer device 205.

Advertisements 220 are set up to be presented on the computer device 205 in an attempt to entice a user of the computer device 205 to engage in some form of commerce (e.g., any conversion event that includes user visit to a web site 225, user purchase of a product, user subscription to an email list, etc.) via the advertiser's system 215. In return for paying attention to the advertisements 220, the user can receive a product or service for free or at reduced cost, or otherwise receive a benefit.

The computer device 205 is an example of the computer 102 of FIG. 1. The computer device 205 may be manifested in a number of forms; for example, the computer device 205 may be a personal computer (PC), a personal digital assistant (PDA), a cell phone, a media player, vehicle entertainment system, etc. The computer device 205 has an operating system 230, and the operating system 230 provides a software platform 235, an input/output management module 240, and an advertising presentation module 245.

The operating system 230 is configured to present one or more of the advertisements 220 to users of the computer device 205. In some implementations, the operating system 230 can disable one or more functions during the presentation of the advertisements 220 and then enable the function(s) in response to the advertisements 220 ending. That is, the operating system can disable some aspect of its operation to prompt the operator to pay attention to the advertisement.

The software platform 235 provides a framework upon which one or more application programs 250 (e.g., programs, services, user interfaces) may be executed. For example, the operating system can disable input to, or output from, one or more of the application programs 250 while the advertisement is being presented.

The input/output management module 240 controls the use of the input device(s) 114 (FIG. 1) and the output device(s) 115 (FIG. 1). For example, the module can have an input devices unit 255 that manages interaction with the input device(s) 114, and an output devices unit 260 that manages interaction with the output device(s) 115.

The advertising presentation module 245 manages the presentation of one or more advertising content 265 (or portions thereof) in the computer device 205. For example, the advertisements 220 or data information associated with the advertisements 220 can be received from the advertiser's system 215 or from the advertisement database 290 of the advertising management system 210, and the advertising presentation module 245 can be configured to store the received advertisements 220 as parts of the advertisement content 265, and present the content 265 at predetermined intervals. The exemplary advertising presentation module 245 shown includes the advertising content 265, a log 270, and controls 275.

The advertising content 265 is a collection of media that could be visual or audible (e.g., static text, interactive applications, video content, audio content) or a combination of both to name a few examples. Various techniques may be used to present the advertising content 265; for example, the advertising content 265 may be presented as a pane (e.g., presented on a pane on top of any other pane) in a user interface of the computer device 205, the advertising content 265 may be presented in a designated area (e.g., in a designated area of a background) of the user interface, the advertising content 265 may be presented in a window for an application program 250, the advertising content 265 may be presented in content from an application program 250, or the advertising content 265 may be presented through the audio output of the computer device 205.

The advertising presentation module 245 can seek to ensure that the user watches and/or listens to the advertising content 265, for example by causing the input devices unit 255 to temporarily disregard user input or by causing the output devices unit 260 to cease generating output from some or all of the application programs 250 during the presentation of advertising content 265. For example, during the presentation of an advertisement, a computer's keyboard and mouse may temporarily be disabled, or a music or DVD player may pause playback.

In some implementations, the operating system 230 can be configured so that it is capable of disabling any or all of several functions. For example, such functions can include, but are not limited to, visual output, audio output, output from an application program, online output, online access, keyboard input, mouse input. That is, when the operating system 230 disables one or more functions, functions that are not disabled may continue operating. For example, a window, screen, speaker or other output component can remain enabled so that it can be used to present the advertisement. Accordingly, the operating system 230 can select the function among a plurality of functions for purposes of an advertisement presentation. Such a selection can be performed a single time for multiple presentations or it can be performed before each advertisement presentation, to name just two examples.

In some implementations, the selection of a function to disable can take into account some aspect of the current system and/or how it is being used. The operating system 230 can choose the disablement so that it targets a particular component that is currently in use. For example, the system can detect that a user is currently playing music and/or video content on the computer and can choose to disable this output entirely or in part to better get the user's attention. As another example, it can be detected that several activities are ongoing in the system, and that one of them is apparently receiving the majority of the user's attention because there are relatively many user inputs to that particular activity compared to the others. In such a situation, the system can choose at least the activity receiving the most attention to be disabled in connection with the advertisement(s). Accordingly, the operating system (e.g., the advertising presentation module 245) can determine at least one activity that is being performed in the computer before the advertisement presentation. The selection of what function(s) to disable can take into account the result(s) of such a determination.

The controls 275 can provide the user of the computer device 205 various approaches for interacting with the advertising content 265 and allow, in some implementations, the user to manage the advertisement presentation to some extent. In some implementations, a user interface with various interface elements may be displayed during the presentation of the advertising content 265 so that the user of the computer device 205 may obtain further information about the advertised product, allow the user to repeat the advertising content 265, or allow the user to view additional advertising content 265, to name a few examples. In one implementation that is primarily audio-based (for example, a portable music player), the controls 275 may be manifested as software or hardware interface elements, and the function of these elements may be modified during the playback of the advertising content 265 to allow the user to repeat the advertising content 265, bookmark the advertising content 265 for later review upon docking with a host computer, and/or to listen to further advertising content 265, to name a few examples. An example of this interaction will be described further in the description of FIG. 4D.

The log 270 can track the presentations of the advertising content 265 on the computer device 205. In some implementations, the log 270 may include, but is not limited to, the ability to record the time and date of when the advertising content 265 was presented, the interactive actions a user took in response to the advertising content 265 (e.g., replay an advertisement, email it to a friend, browse the advertiser's web site 225, do nothing), and/or track the identity of the interactive user.

The advertising management system 210 can provide some or all of the advertising content 265 to the advertising presentation module 245. The advertising management system 210 can also receive reports stored in the log 270 about activity on the computer device 205, to confirm whether the advertising content 265 has been presented, optionally along with any other information that may be recorded therein. The advertising management system 210 may also deliver additional information to the advertising presentation module 245 that configures the operating system 230 to perform the presentation and temporary disablement steps at predefined times. Such additional information and other possible updates associated with the functions performed by the advertising presentation module 245 may be transferred or downloaded to the computer device 205 via the network 108 on a scheduled or random basis.

The process of presenting the advertising content 265 and receiving reports about information from the log 270 may be used as part of an approach for subsidizing the cost of hardware and/or software for the computer device 205. For example, a manufacturer of the computer device 205 (e.g., Apple Computer Inc.) may provide the computer device 205 (e.g., a Macintosh computer, an iPod media player and the like) and/or software (e.g. Mac OS X, iTunes, etc.) to users (or consumers) at a reduced cost or for free in return for the ability to present advertisement on the computer device 205. In such an example, the manufacturer may operate as the advertisement management system 210, or alternatively, partner with an external source to operate as the advertisement management system 210 that forwards the advertising content 265 to the computer device 205, and can optionally collect the log 270 from one or more of the devices. In another example, the manufacturer could sell advertisement "space" available on the computer device 205 to advertisers and/or generate additional revenue based upon user interactions with the advertisements 220; for example, by collecting a fixed or variable fee from an advertiser for every time a user visited the advertiser's web site 225 via a hyperlink embedded in the advertisement 220.

The advertising management system 210 can include an advertising assignments feature 280, a usage tracking feature 285, and an advertisement database 290. The advertising management system 210 can retrieve the advertising content 265 from the advertisement database 290 and send the content 265 over the network 108 when the computer device 205 is online. The advertising content 265 available in the database 290 can have been obtained from the advertiser's system 215.

The advertising assignments 280 feature defines what advertising content 265 is to be delivered to what particular computer device 205 and/or to which users, and/or defines when the advertisements 220 should be shown, to name some examples. The advertising assignments 280 may be based upon the computer device's 205 capabilities; for example, high-resolution forms of the advertising content 265 may be assigned to desktop computers, reduced-bandwidth content 265 may be assigned to laptop computers, low-resolution content 265 may be assigned to PDAs and video media players (e.g., video ipods), and audio-only content 265 may be assigned to audio-only media players (e.g., iPod Shuffle). The assignments 280 may be based upon users' preferences; for example, a user may have filled out a questionnaire where he or she may have expressed a special interest in travel, and therefore may receive a greater proportion of travel related advertisements 220. In another example, the advertising content 265 may be assigned based upon users' demographic information; for example, an advertiser for sports equipment may choose to market snowboards to younger users and golf clubs to older users. In another example, the advertising content 265 may be assigned based upon users' geographic location; for example a regional chain of restaurants may choose to advertise only to users who live in that same region.

The advertisement system's usage tracking feature 285 monitors the reports that are returned from the computer device 205, and can use this information to tailor the assignments 280 of advertisements 220. For example, the usage tracking feature 285 may detect that a particular user clicks through a high percentage of ads for automobiles, and can respond by delivering to that user a greater ratio of advertising content 265 for automobiles or auto accessories. The user's response to the advertising content 265 can be monitored; for instance, the user may show interest in the advertising content 265 for minivans or mobile DVD players, and the usage tracking feature 285 may infer that the user has a young family and respond by assigning a higher ratio of advertisements for children's clothing or family movies.

In some implementations, the usage tracking feature 285 may also aggregate the responses of all users of a particular computer device 205. For example, one user of a computer device 205 may respond to advertising content 265 for airlines while a second user of that device may respond to advertising content 265 for hotels. Based upon this information, the usage tracking feature 285 may infer that these users are planning a trip, and may respond by assigning a higher ratio of airline and hotel related advertising content 265, and also a higher ratio of content 265 for rental cars or cameras as well.

The advertiser's system 215 can be the computer system from which advertising content 265 originates, and the advertiser's system 215 can be the target with which the advertiser wishes the computer device 205 users to interact. In the illustrated implementation, the advertiser's system 215 includes the one or more advertisements 220 and the web site 225. Using the network, the advertiser's system 215 may send advertisements 220 to the advertising management system 210, which stores the advertisements 220 in the advertisement database 290. This can allow an advertiser to manage the content of the advertisements 220 that are assigned to the computer device 205. The web site 225 of this example may be the target of the advertisements 220; for example, the advertisements 220 may promote the advertiser's web site 225 in an effort to offer and/or sell products, goods, or services. In this exemplary manner, the advertiser directly or indirectly subsidizes the costs of the computer device 205s and/or software.

Figure 3:
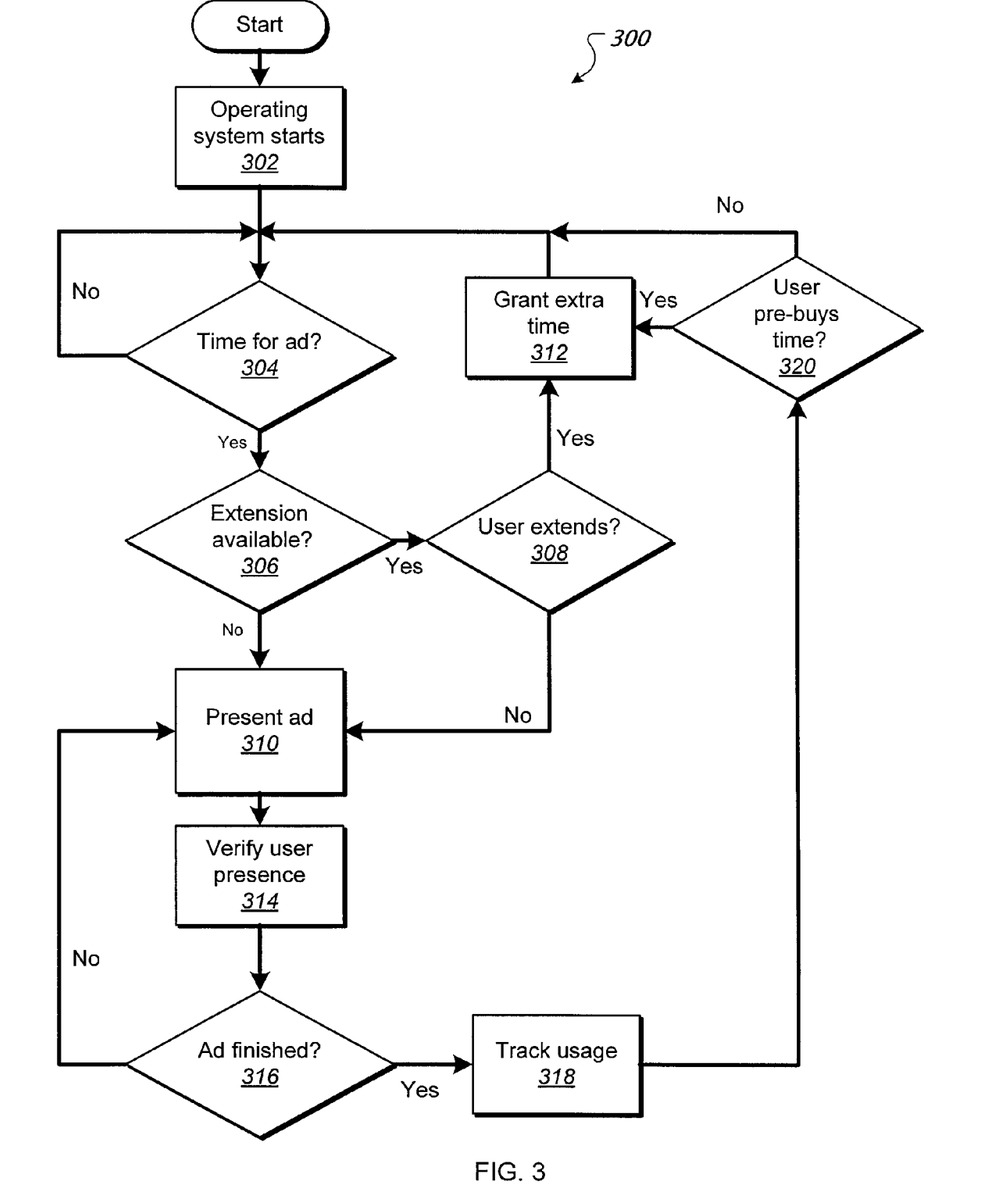
FIG. 3 is a flow chart showing exemplary operations for presenting advertisements.

FIG. 3 is a flow chart that illustrates an exemplary method 300 of operations. For example, the operations can be performed on the computer device 205 of FIG. 2. These operations relate to the presentation of advertising content and the enabling/disabling of a function in the operating system.

In step 302, the operating system is started. The computer device 205 can initiate the operating system 230 upon startup, as a part of a recovery from a hard or soft reset, as part of a manual operation, and/or other methods by which the operating system 230 may be started, to name a few examples.

The method 300 determines if it is time to present an instance of advertising content at step 304. This determination and timing, in some implementations, may be determined by the advertising presentation module 245 and/or the advertising assignments 280. This timing can be based on, but is not limited to, the actual time and/or date, the amount of time that the operating system 230 has been running, the amount of time the computer device is actively being used (as opposed to sitting idle), and/or by the amount of processing power being used (e.g., the performance of CPU-intensive tasks may prompt more frequent presentation of advertising content 265 than the performance of less CPU-intensive tasks) or other measurands. If at step 304 it is determined that it is not yet time to present an advertisement, then step 304 can be repeated. If it is determined at step 304 that it is time to present an advertisement, then the method 300 continues at step 306.

Another determination is made at step 306 to see if a time extension is available to the user. As one example, the user may be voluntarily exposed to the advertising content 265 to receive time credit in form of time extensions to delay future presentations of the advertisement content 265. As another example, a predefined number of extensions (such as only one) may be available at any time, but at the expense of a next advertisement-free time period being shortened by a corresponding amount of time. If such a time extension is available, the method 300 continues with step 308. If such a time extension is not available, the method 300 proceeds to step 310.

In step 308, it is determined whether the user takes the extension. The user has the option to delay the presentation of advertisement content 265 by using the available time extensions. For example, in a desktop computer, the user can select one of the controls 215 to choose to watch the advertisement content 265 immediately, or to delay the presentation by using the available time extensions. In an implementation of the computer device 205 as an audio player with only hardware buttons and no display, the advertising presentation module 245 may present an audible prompt to the user, and the controls 275 may be implemented by programming the behavior of the hardware buttons (e.g., the "fast-forward" button can be configured to extend time, and the "rewind" button can be configured to present an advertisement immediately). If the user chooses to use a time extension, then the method 300 continues at step 312. Otherwise, if the user chooses not to use a time extension then the method 300 continues at step 310.

At step 312, the user has chosen to use a time extension and extra time is granted. In implementations of the method 300 where the user is allowed to accrue time extension credits, this step may also deduct credits from the user's total amount of accrued time extension credits. The method 300 then proceeds to repeat step 304.

At step 310, an advertisement is presented. For example, the advertising presentation module 245 can interact with the operating system 230 and/or the application program 250 in order to present the advertisement content 265 to the user.

Optionally, a function of an operating system can be disabled during the advertisement. In some implementations, the system disables the function(s) so the user's attention is not diverted to another system aspect, such as to make a user input or to view or hear application output. For example, one or more items controlled by the input devices unit 255 and/or the output devices unit 260 can be disabled while the function is disabled.

Different timings of the disablement can be used. In some implementations, the disablement can start before (such as a few seconds ahead of) the beginning of the advertisement. In some implementations, the disablement can start at the same time as the advertisement. In some implementations, the disablement can start after (such as a few seconds later than) the beginning of the advertisement. Similarly, different timings can be used for the end of the disabling. The disabling can end before, at the same time as, or after the end of the advertisement. The timings for beginning and ending the disabling can be selected independently of each other.

In an attempt to ensure that the user is actually watching and/or listening to the advertisement content, the method 300 can include a step 314 for verifying user presence and giving proper credit (e.g., time for using the operating system 230, time for using the application program 250, time extension credit). In some implementations, the advertisement presentation module 245 can prompt the user to confirm that he or she is reviewing the content (e.g., paying attention to the advertisement) being presented (e.g., the user is prompted to click a certain button, click a certain object or area on the screen, press a particular key or keys). In some implementations where the computer device 205 is a cell phone or music player, the user may be prompted to press a certain button or keypad key in order to confirm that they are paying attention. In one implementation, the approaches for verifying user presence can be made progressively more aggressive if the user has failed a previous test. For example, after the user fails the test the first time, the subsequent tests can be made to appear more frequently or at varying times. As another example, the test(s) can be made more subtle so as to render them more difficult to perceive, such as by reducing the size of a message box on the screen, or by making an audio prompt more similar to the advertisement in which it is inserted. If the user fails the test in step 314 the method 300 can perform step 310 over again; that is, the entire advertisement can be played again while the operating system maintains the function(s) in a disabled state. As another example, the user's failure can first result in any available extension(s) being consumed (compare step 306), and only thereafter is an advertisement played in its entirety.

At step 316, the method checks to see if the presentation of the advertisement has finished. That is, it is contemplated that the advertisement has a definite length and after it is finished the operating system should again enable the disabled function(s), if any. This determination may be made by, but is not limited to, the conclusion of playback of the advertising content, the verification of user presence, and/or the accumulation of an amount of time extension credits. For example, some users may attempt to accrue usage time by having the computer device 205 present many instances of the advertisement content 265 back-to-back while he or she is absent. Therefore, method 300 can be implemented in such a way as to require that in order to receive credits, the users must verify that they actually were present and attentive during the presentation. In implementations that disable a function of the computer during the advertisement, the determination that the advertisement has finished can trigger the re-enablement of the disabled function. In situations where the length of the advertisement is known in advance, step 316 need not be performed, or can be performed in a modified way, such as to re-enable the function before the advertisement ends, for example.

If the criteria for determining whether an advertisement has been satisfied, then the method proceeds to step 318. If the criteria for determining whether an advertisement has not been satisfied, then step 310 is repeated.

Advertisement presentation, user interaction information, and other related usage can be tracked at step 318. In the example of computer device 205, this information is recorded in the log 270, for the use of the usage tracking feature 285. In this exemplary manner, the advertising management system may use this information to alter the behavior of the advertising assignments feature 280, and obtain payments from the advertiser(s) for the total volume of advertising content 265 presented on their behalf and/or the kinds of interactions users have taken with those presentations.

At step 320, it is determined whether the users chooses to pre-buy usage time. For example, the user may volunteer to watch the presentation of additional advertising content 265 in order to accrue time extension credits. In another example, the user may have an option to pay a fee in exchange for the temporary or permanent advertisement-free use of the computer device 205. If the user chooses to pre-buy time, then the extra time is granted at step 312. Otherwise, if the user opts not to pre-buy time, then the method repeats at step 304.

Figure 4A:
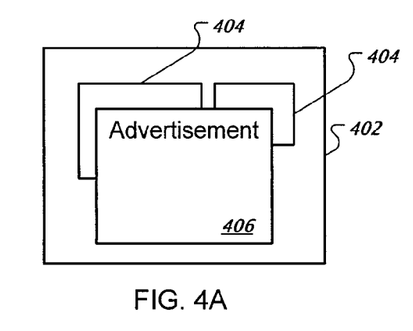
FIGS. 4A-D depict exemplary screen shots of presenting advertisements in a user interface.

FIGS. 4A-D illustrate examples of how advertisement content can be presented. For example, the advertisement content 265 can be presented in a display 402 that is part of the computer device 205. In FIG. 4A, the display 402 shows two instances of a program screen area 404 corresponding to one or more application programs. Each of the screen areas 404 may be the visual component of instances of the application program 250, for example. In this implementation, the advertising presentation module 245 has determined that it is time to present the advertisement content 265, and interacts with the input/output management module 240 in a manner such that the output devices unit 260 (in this case, controlling the display 402) presents the advertisement content 265. In this illustrative example, the advertisement content 265 is presented in an advertisement screen area 406. The advertisement screen area 406 can be displayed on top of any or all instances of the program screen area 404. In this manner, the user is prompted to watch the advertisement content 265 because it obscures the program screen area(s) 402.

Figure 4B:
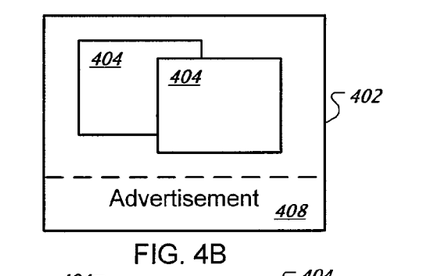

In FIG. 4B, the display 402 shows one or more of the program screen area(s) 404 as well as an advertisement screen area 408. In this example, the advertisement screen area 408 is a designated area of a user interface background, and is for example displayed as a "docked" region of the display 402. In this manner, the user is prompted to watch the advertisement content 265 because it occupies a portion of the total viewable area of the screen 402.

Figure 4C:
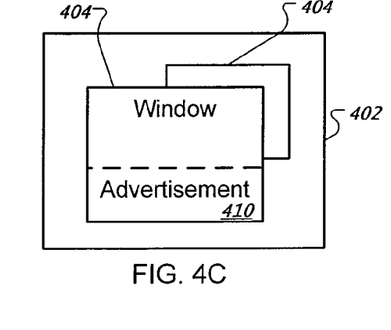

FIG. 4C depicts a third example in which the advertising content is presented in an advertisement screen area 410 that is inserted in content from an application program, and for example displayed as a "docked" region of a program screen area 404. In another implementation, the advertisement content can be presented by occupying the entire area of the display 402, by overlaying the content semi-transparently over part or all of the display 402, to name a few examples.

Figure 4D:
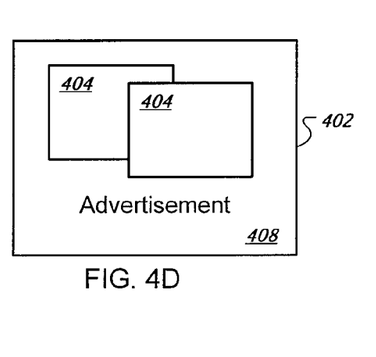

FIG. 4D shows an example where advertising content is presented in the advertisement screen area 408 (see also FIG. 4B), and where this area 408 extends substantially over an entire background or desktop space in the display. That is, the advertisement screen area 408 can be configured to have any of many different sizes and/or shapes, for example those shown in these figures.

Figure 4E:
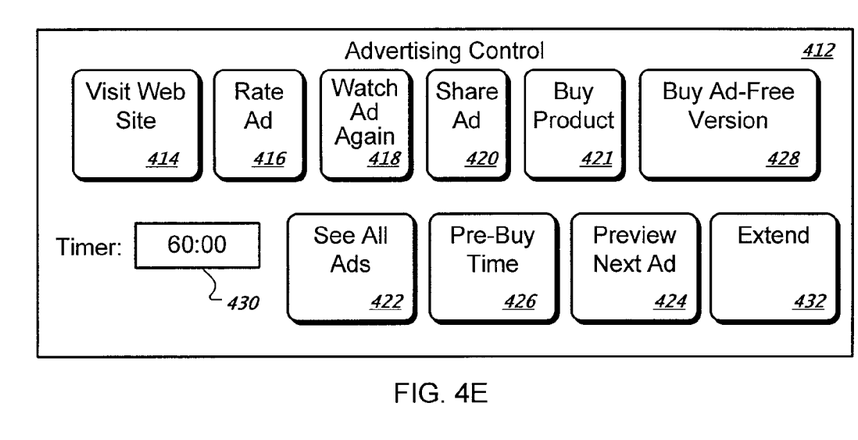
FIG. 4E depicts an exemplary user interface for interacting with advertisements.

FIG. 4E is an illustrative example of the controls 275 (FIG. 2). In this example, the controls 275 appear as an advertising control 412 that includes a collection of interface elements (e.g., menu items, buttons, etc.) to perform various functions. For example, the control 412 includes a "visit web site" element 414 that allows a user to visit the website relating to the subject of the advertisement content 265. The control 412 also includes a "rate ad" element 416 that allows a user to give feedback to the advertiser concerning the advertisement content 265, and a "watch ad again" element 418 that allows the user to replay the advertisement content 265. The following are additional examples. The control 412 can include a "share ad" element 420 that provides the user with a way to encourage other users to view the advertisement content 265. The control 412 can include a "buy product" control 421 that initiates a transaction for purchasing a product/service to which the advertisement content relates. The control 412 can include a "see all ads" element 422 lets the user choose from among all the available advertisement content 265. The control 412 can include a "preview next ad" element 424 that allows the user to view a snippet of the advertisement content 265 that is to be played next.

In addition to interface elements that control the playback of advertisement content 265, the control 412 further includes a "pre-buy time" element 426 that lets the user view another advertisement ahead of its scheduled time to create a longer period of time when the system is not interrupted by advertisements. The control 412 also includes a "buy ad-free version" element 428 that lets the user make a purchase that will end the presentation of advertisement content 265. For example, the user can choose to purchase the right to use the operating system 230 (i.e., the computer device 205) free of commercials. This transition can be accomplished by the advertising management system 210 pushing software to the computer device 205, or by disabling the advertising presentation module 245, to name two examples.

In addition to the various interface elements described above, the advertising control 412 also displays a timer 430 that shows the amount of time remaining until the user will be compelled to view the next presentation of the advertisement content 265. The control 412 also includes an "extend" element 432 that lets the user postpone the presentation of the advertisement content 265 (e.g., to finish working on a task right now). This extended time can be taken out of the next ad-free period (e.g., the user can only perform the operation twice). The "extend" element 432 can further allow a user to extend an advertisement presentation by a predetermined delay that depends on the availability of extensions accrued by the user. In some implementations, the "extend" element 432 may be grayed out from user selection to indicate that no extension is available.

Figure 4F:
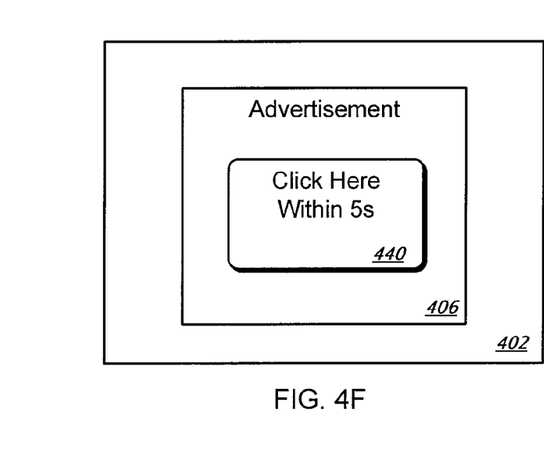
FIG. 4F depicts an exemplary advertisement that includes a prompt for user interaction.

FIG. 4F is an illustrative example of the display 402 that shows another example of the advertisement screen area 406. In this implementation, the advertisement screen area includes a response button 440. The response button 440 is displayed in order to confirm that the user is actually watching the advertisement content 265. During the presentation of the advertisement content 265, the response button 440 may appear at a time that the user does not know of in advance, such as after about a third of the advertisement has been presented. The response button 440 may appear in different screen locations, it may appear with a different size, and/or it may respond to different keyboard shortcuts, etc., in order to confirm the presence of an attentive user. If the user clicks on the button (for example, within a predefined time from when it is displayed), then this advertisement counts as having been watched by the user.

In contrast, if the user does not click (within the predefined time), then the advertisement does not count. Several different actions can be taken in this situation. For example, a new advertisement begins playing and the system maintains the function(s) disabled until it is finished. As another example, the system can automatically treat this as if the user had chosen to extend (see, e.g., step 308 in FIG. 3) and let the user continue working with the system for now, but with a corresponding reduction in the next advertisement-free time period.

Figure 5:
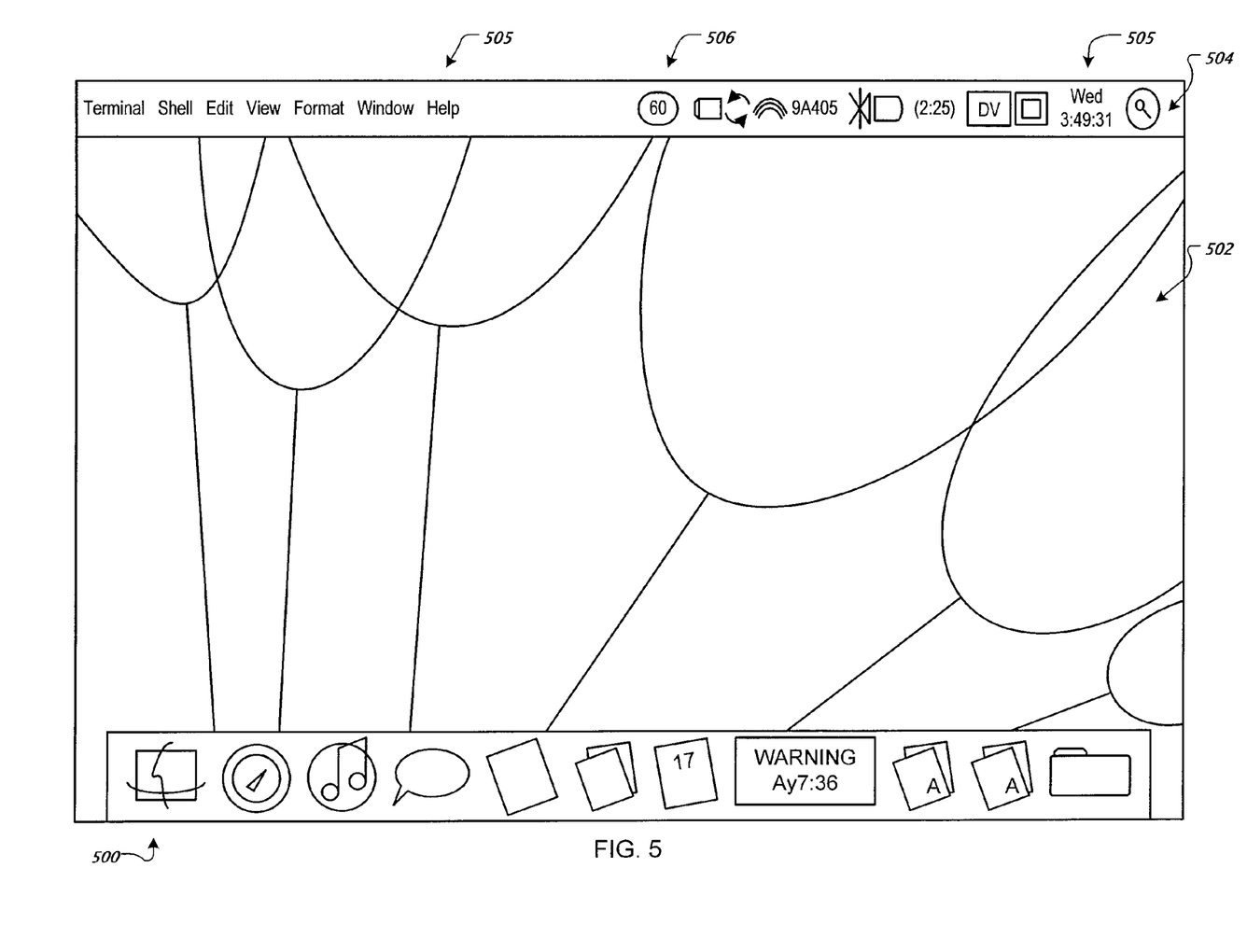
FIG. 5 is a screen shot showing an exemplary desktop user interface.

FIG. 5 is a screen shot showing a desktop user interface 500. The desktop user interface 500 (also referred to herein as "desktop UI") may be used to present one or more advertisements, such as the advertisement content 265 (FIG. 2). The desktop UI 500 may display one or more advertisement screen areas (e.g., advertisement screen area 406 in FIG. 4E), such as on top of any instance of other application programs for displaying advertisement content.

Referring to FIG. 5, the desktop UI 500 can be a user interface provided by an operating system, such as Mac OS® from Apple Computer, Inc. of Cupertino, Calif. In some implementations, the UI 500 may facilitate to present the interface used with a control for advertisements, such as the advertising control 412 (FIG. 4D).

As shown, the desktop UI 500 here has a menu bar 504, an on-screen work area that includes a background image 502, and one or more other features such as windows and icons. The menu bar 504 can include user interface elements such as a time of day field 505 and a help field 507.

The menu bar 504 includes a timer 506. The timer 506 may indicate an amount of time remaining (referred hereinafter as "grace period") until the next advertisement presentation. In the example shown, the timer 506 currently displays "60", indicating that sixty seconds remaining until the next advertisement will be shown. Other timing methods also are contemplated. For example, the timer 506 may indicate a date on or a time at which presentation of an advertisement will be executed (e.g., on Jan. 1, 2007, or at 7:00 pm). The timer 506 may count down to a zero value, or increment up to a specific value. If desired, the timer 506 may be configured to visually or audibly alert the user prior to reaching a zero or specific value.

In some implementations, the time displayed by the timer 506 may be set by the advertising presentation module 245 and/or advertising assignments 280. In another implementations, the time may be set by a processor (e.g., processor 103) of a computer device (e.g., computer 102 or computer device 205) running the desktop UI 500 to prevent unauthorized interference or malicious manipulation with the time. The processor may wait for a user selection to run a random or scheduled advertisement during the grace period (as will be discussed in greater detail below with respect to FIG. 6), or compare an elapsed time as indicated by the timer 506 to a predetermined maximum time (referred hereinafter as a "timeout period"). If the timeout period has been reached without a user selection to execute the advertisement presentation, the processor may automatically activate the presentation without user intervention. If the timeout period has not been reached and a user has yet to make a determination to watch an advertisement presentation, the timer 506 remains displayed and the processor may continue to monitor user action.

At the conclusion of an advertisement presentation, the timer 506 may automatically be reset. For example, upon completion of an advertisement presentation, the processor may reset the timer 506 to a preset time. The preset time may be determined by an advertiser or promoter sponsoring the advertisement presentation. Alternatively, the preset time may be regulated by the manufacturer of the computer device running the desktop UI 500.

In some implementations, when a cursor is hovered on the timer 506 or when the timer 506 is clicked on by the cursor, a contextual menu is displayed. The contextual menu may display one or more functions or controls for executing the advertisement presentation. Such functions and controls may be presented as buttons, commands in the form of menu items, or other user interface elements that can be manually selected by a user. For example, the user may navigate to a specific menu item within the contextual menu using a cursor. The cursor can be a common pointer as controlled by input devices such as a standard mouse, trackball, keyboard pointer, touch screen or other user manageable devices or navigation tools. These input devices can generally control movement of a cursor in response to input received from the user.

Figure 6:
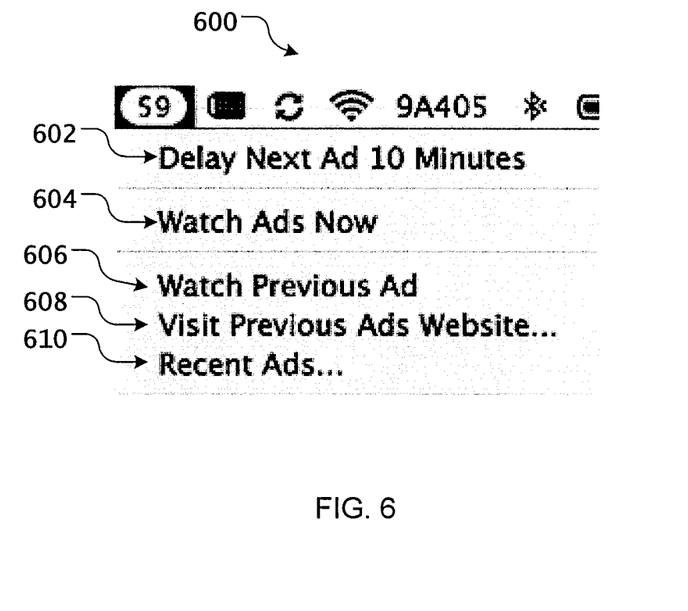
FIG. 6 is a screen shot showing an exemplary contextual menu.

FIG. 6 shows an example of a contextual menu 600. The contextual menu 600 may include one or more menu items 602-610 each associated with how or when an advertisement presentation will be presented. In some implementations, one or more menu items (e.g., menu item 608) may include a uniform resource link that permits a user to navigate to a landing page or a website provided by an advertiser (e.g., web site 225) where the user may consummate a purchase of a product or a service being promoted by the advertisement presentation.

Referring to FIG. 6, the contextual menu 600 may include, without limitation, menu items 602-610 labeled as "Delay Next Ad 10 Minutes", "Watch Ads Now", "Watch Previous Ad", "Visit Previous Ads Website" or "Recent Ads". A user may select one of the menu items 602-610 by manual selection (e.g., by clicking using a cursor), or by pressing a function key or key combination, or by some other means for invoking the functions or controls associated with the menu items 602-610.

If a user wishes to delay an advertisement presentation, the user may simply select the "Delay Next Ad 10 Minutes" menu item 602. Upon selection, the "grace period" may be extended instantaneously. For example, the grace period may be extended by a total of ten minutes before the advertisement presentation is executed. The extended grace period may then be reflected by the timer 506. As an example, if the timer 506 currently displays sixty seconds remaining to execute an advertisement presentation and a user has selected to delay the advertisement presentation by one minute, then the timer 506 may automatically adjust the current remaining time to display a total of one hundred twenty seconds.

Generally, a user may receive time extensions by watching additional advertisement(s) on a voluntary basis. The user may also purchase time extension (e.g., by clicking on the "pre-buy time" element 426) that can be used to delay any advertisement presentation. The user may collect a fraction of a time extension when viewing a previously-watched advertisement should an associated advertiser provide such a subsidized campaign.

In some implementations, if it is determined (e.g., by the advertising presentation module 245) that no time extension is available to the user, the menu item 602 may be grayed out from user selection, indicating that the user will need to purchase additional time extension or to purchase an ad-free version of the system prior to the advertisement presentation.

The user also may manually activate an advertisement presentation. As an example, a user may select the "Watch Ads Now" menu item 604 to instantly begin the advertisement presentation. If the user selects this menu item prior to a scheduled time of the presentation, the user may receive time extensions. The user also may select the "Watch Previous Ad" menu item 606 to view previously watched advertisement(s). In some implementations, a user may browser a catalog of previously presented advertisements when the "Recent Ads" menu item 610 is selected. For example, upon selection of the "Recent Ads" menu item 610, another menu or window showing a list of previously presented ads may be populated. The list may include, for example, the last five advertisements presented to the user. In some implementations, the list may include all advertisements presented to the user. Should a user desire to visit advertisers' website(s) associated with any of the previously presented advertisements, for example, to purchase or to learn about a product or service, the user may select the "Visit Previous Ads Website . . . " menu item 608 to effectuate this process.

While the contextual menu 600 is shown to include five menu items, the number of menu items is not limited, and other menu items also may be included in the contextual menu 600. For example, the contextual menu 600 may include a "Rate Ad" menu item that lets a user rate the effectiveness of an advertisement based on a spectrum of ranks, a "Watch Ad Again" menu item which permits a user to replay an advertisement presentation, a "Share Ad" menu item that allows a user to forward the advertisement presentation or a link to the advertisement presentation to one or more parties, or a "Preview Next Ad" menu item which displays a snippet or a portion of an advertisement presentation that is to be played.

Figure 7:
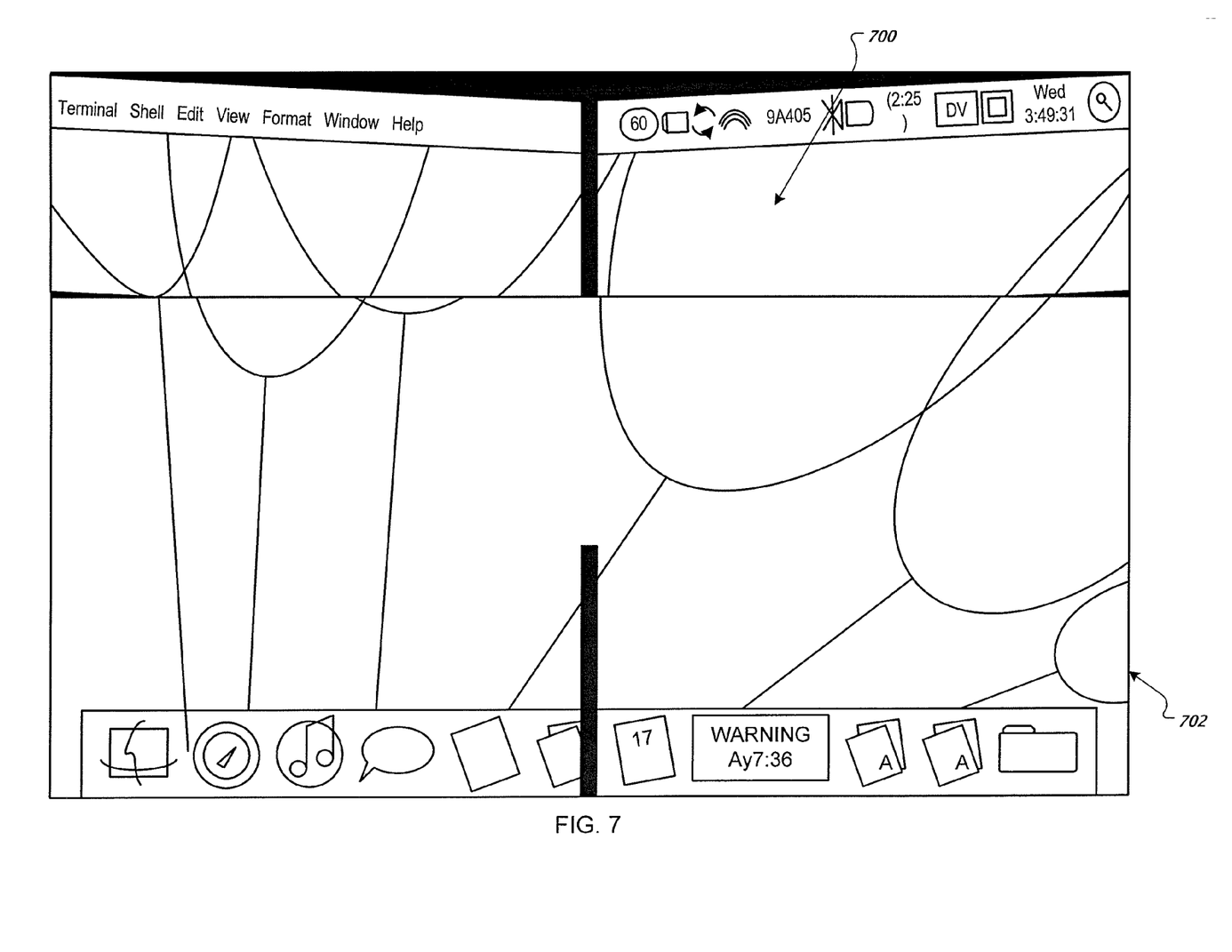
FIG. 7 is a screen shot showing an example of an initial phase for a presentation of an advertisement.

In response to receiving a user input to begin the presentation of an advertisement, the current state of the desktop UI 500 may be saved and temporarily inactivated. In some implementations, the desktop UI 500 remains active but the functions of input devices (e.g., input devices 114) and output devices (e.g., output devices 115) coupled to the computer device (e.g., computer 102 or computer device 205) are disabled. Such functions may be temporarily disabled by a processor (e.g., processor 103) or by the advertising presentation module 245 communicating with the processor 103. Concurrently or subsequently, an animation or other graphical effects may be played or presented during an initial phase of a presentation to introduce the advertisement. FIG. 7 depicts an example of an initial phase of an advertisement presentation. In the example shown, a split-screen animation 700 is executed prior to the introduction of an advertisement. The animation may occupy the entire screen 702. Alternatively, the animation may occupy only a portion of the screen 702. Other graphical effects also are contemplated. For example, the desktop UI 500 and its components (e.g., menu bars, icons, etc.) may be faded, darkened, brightened, blurred, distorted or otherwise visually modified during the initial state (or while the advertisement is being presented) so as to emphasize that the desktop UI 500 is temporarily inactive.

An advertisement presentation may occupy the entire screen 702 so as to prevent the user from engaging in any desktop activities. To verify user presence during the presentation of the advertisement, in some implementations, a message may be populated, on a schedule or random basis, which may require user action or confirmation. As an example, a message may be populated which may require a user to click on the message within three seconds. As another example, a message may be populated which may require a user to enter the current date, name of the advertiser, type of the product or service being advertised, particular textual information being displayed and the like.

In some implementations, a user may dismiss an advertisement presentation prior to completion, for example, by clicking on the advertisement (or on an unoccupied screen area outside the advertisement if the advertisement presentation occupies only a portion of the screen 702), which may prompt the processor 103 or the log 270 to record such an action so as to debit the user accordingly for the unfinished presentation. It should be understood that other commands, key combinations, icons, or other user input can be used to dismiss the advertisement. Upon conclusion or dismissal of the advertisement presentation, the position, state, and configuration of the desktop UI 500 may be restored.

As discussed above, an advertisement presentation may occupy only a portion of the screen 702. The advertisement presentation may be displayed in an advertisement screen area (e.g., advertisement screen area 408). In this example, the user can drag the advertisement screen area to any location on the screen 702 as desired.

While the presentation of a single advertisement has been described, multiple advertisement presentations also are possible. The multiple advertisement presentations may be concurrently or sequentially executed. If desired, the multiple advertisement presentations may be arranged hierarchically by type (e.g., food-related, tools-related, etc.), or alphabetically, or by any other categorization methodology. A text label also may be added that indicates a type of each advertisement (e.g., sporting goods) or a name of an associated advertiser (e.g., Joe's Sporting Goods).

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. Accordingly, other implementations are within the scope of the following claims.

What is claimed is:

1. A method comprising:
   executing, by a computing device, an operating system configured to present an advertisement on the device;
   detecting, by the device, whether the operating system presents the advertisement in compliance with one or more viewing requirements of the advertisement, the viewing requirements including at least one requirement that the advertisement is presented to a user;
   invoking, by the device, an advertisement enforcement routine of the operating system in response to the detecting, the enforcement routine comprising:
      detecting that a first process and a second process, other than the operating system, are being performed on the computing device;
      comparing a first number of inputs received by the first process with a second number of inputs received by the second process;
      when the first number of inputs is greater than the second number of inputs, determining that the first process is receiving more attention than the second process; and
      upon a determination that the first process is receiving more attention than the second process, disabling at least the first process; and
   generating, by the device, a report in response to the detecting whether the operating system presents the advertisement in compliance with one or more viewing requirements of the advertisement, the report confirming whether the advertisement has been presented.

2. The computer-implemented method of claim 1, further comprising identifying, by the device, using the report, presentation data relating to the presentation of the advertisement.

3. The computer-implemented method of claim 2, wherein identifying the presentation data comprises:
   determining whether a user pays attention to the advertisement.

4. The computer-implemented method of claim 3 wherein determining whether the user pays attention to the advertisement comprises requiring the user to provide input as the advertisement is presented on the device.

5. The computer-implemented method of claim 1, further comprising:
   selecting, by the device, an advertisement for the operating system based on information about a user of the device.

6. The computer-implemented method of claim 1 wherein one of the advertisement enforcement routines comprises disabling at least a the device or some portion of the device until the advertisement has been successfully presented to the user.

7. The computer-implemented method of claim 6 wherein disabling the at least a portion of the device comprises disabling user input while the advertisement is presented on the device.

8. The computer-implemented method of claim 6 wherein disabling the at least a device or some portion of the device comprises disabling some or all application programs on the device.

9. The computer-implemented method of claim 6 wherein disabling the at least a portion of the device comprises disabling online access.

10. The computer-implemented method of claim 1 wherein the operating system is configured to prevent visual or audio output from other applications from impairing the presentation of the advertisement.

11. The computer-implemented method of claim 1 further comprising:
    receiving, by the device, the advertisement over a network from an advertisement server.

12. The computer-implemented method of claim 1, further comprising:
    receiving, by the device, user input prompting the presentation of the advertisement to be postponed for a predefined amount of time;
    postponing, by the device, in response to user input, the presentation of the advertisement by the predefined amount of time; and
    reducing, by the device, a time until a subsequent advertisement is presented by the predefined amount of time.

13. The computer-implemented method of claim 1, further comprising:
    receiving, by the device, user input prompting the advertisement to be presented a predefined amount of time earlier than scheduled, wherein the advertisement is presented according to the user input; and
    extending, by the device, in response to the user input and by the predefined amount of time, a time until a subsequent advertisement is presented.

14. The computer-implemented method of claim 1, wherein the advertisement is presented using a presentation technique selected from the group consisting of:
    presenting the advertisement as a pane on top of any other pane in a user interface of the device;
    presenting the advertisement in a designated area of a background of the user interface;
    presenting the advertisement in a window for an application program;
    presenting the advertisement inserted in content from an application program;
    presenting the advertisement through an audio output of the device; and
    combinations thereof.

15. The computer-implemented method of claim 1, further comprising presenting, by the device, a user-selectable control that when activated triggers at least one selected from the group consisting of:
    causing presentation of a page from an advertiser associated with the advertisement;
    recording a user rating of the advertisement;
    again presenting the advertisement;
    sharing the advertisement with another user;
    initiating a transaction for user purchase of a product that eliminates the presentation of advertisements in the device;
    postponing presentation of the advertisement;
    causing the advertisement to be presented ahead of schedule;
    causing a previous advertisement to be presented;
    causing a preview of a subsequent advertisement to be presented;
    causing an overview of all available advertisements to be presented; and
    initiating a transaction for user purchase of a product or service to which the advertisement relates.

16. The computer-implemented method of claim 1, further comprising:
    disabling, by the device, a function in the device, wherein the advertisement is presented while the function is disabled; and
    enabling, by the device, the function in response to the advertisement ending.

17. A computer program product embodied in a non-propagating computer-readable medium and comprising instructions that when executed by a processor perform a method for providing an advertisement on a device, the method comprising:
    executing an operating system by a processor on a device, the operating system configured to present an advertisement on the device;
    detecting, by the device, whether the operating system presents the advertisement in compliance with one or more viewing requirements of the advertisement, the viewing requirements including at least one requirement that the advertisement is presented to a user;
    invoking, by the device, an advertisement enforcement routine of the operating system in response to the detecting, the enforcement routine comprising:
        detecting that a first process and a second process, other than the operating system, are being performed on the computing device;
        comparing a first number of inputs received by the first process with a second number of inputs received by the second process;
        when the first number of inputs is greater than the second number of inputs, determining that the first process is receiving more attention than the second process; and
        upon a determination that the first process is receiving more attention than the second process, disabling at least the first process; and
    generating, by the device, a report in response to the detecting whether the operating system presents the advertisement in compliance with one or more viewing requirements of the advertisement, the report confirming whether the advertisement has been presented.

18. A non-propagating computer-readable medium having program code stored thereon which, when executed by a processor of a device, causes the processor to perform the operations of:
    executing an operating system, the operating system configured to present an advertisement on the device;
    detecting whether the operating system presents the advertisement in compliance with one or more viewing requirements of the advertisement, the viewing requirements including at least one requirement that the advertisement is presented to a user;

invoking an enforcement routine of the operating system in response to the detecting, the enforcement routine comprising:
- detecting that a first process and a second process, other than the operating system, are being performed on the computing device;
- comparing a first number of inputs received by the first process with a second number of inputs received by the second process;
- when the first number of inputs is greater than the second number of inputs, determining that the first process is receiving more attention than the second process; and
- upon a determination that the first process is receiving more attention than the second process, disabling at least the first process; and generating a report in response to the detecting whether the operating system presents the advertisement in compliance with one or more viewing requirements of the advertisement, the report confirming whether the advertisement has been presented.

19. The operating system of claim 18, wherein the operating system is configured to present the advertisement using a presentation technique selected from the group consisting of:
- presenting the advertisement as a pane on top of any other pane in a user interface of the device;
- presenting the advertisement in a designated area of a background of the user interface;
- presenting the advertisement in a window for an application program;
- presenting the advertisement inserted in content from an application program;
- presenting the advertisement through an audio output of the device; and
- combinations thereof.

* * * * *